United States Patent
Mason et al.

(10) Patent No.: US 12,224,432 B2
(45) Date of Patent: *Feb. 11, 2025

(54) ELECTROACTIVE MATERIALS FOR METAL-ION BATTERIES

(71) Applicant: Nexeon Limited, Abingdon (GB)

(72) Inventors: Charles Mason, Abingdon (GB); Richard Taylor, Abingdon (GB); James Farrell, Abingdon (GB); William Macklin, Abingdon (GB)

(73) Assignee: Nexeon Limited, Abingdon (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,304

(22) Filed: Jun. 26, 2023

(65) Prior Publication Data

US 2024/0154098 A1    May 9, 2024

Related U.S. Application Data

(63) Continuation of application No. 17/316,908, filed on May 11, 2021, now Pat. No. 11,695,110, which is a continuation of application No. 16/274,182, filed on Feb. 12, 2019, now Pat. No. 11,011,748.

(30) Foreign Application Priority Data

| Nov. 8, 2018 | (GB) | ..................................... 1818232 |
| Dec. 19, 2018 | (GB) | ..................................... 1820736 |

(51) Int. Cl.
| H01M 4/36 | (2006.01) |
| H01B 1/18 | (2006.01) |
| H01M 4/38 | (2006.01) |
| H01M 4/62 | (2006.01) |
| H01M 10/0525 | (2010.01) |
| H01M 4/02 | (2006.01) |

(52) U.S. Cl.
CPC ........... *H01M 4/366* (2013.01); *H01M 4/386* (2013.01); *H01M 4/625* (2013.01); *H01M 10/0525* (2013.01); *H01M 2004/021* (2013.01); *H01M 2004/025* (2013.01)

(58) Field of Classification Search
CPC ...... H01M 4/364; H01M 4/133; H01M 4/134; H01M 4/386; H01M 4/625; H01M 10/0525; H01M 2004/021; H01M 2004/027
See application file for complete search history.

(56) References Cited

U.S. PATENT DOCUMENTS

| 11,011,748 | B2 * | 5/2021 | Mason | .............. H01M 10/0525 |
| 11,165,054 | B2 * | 11/2021 | Mason | .................. H01M 4/134 |
| 11,688,849 | B2 * | 6/2023 | Mason | .................. H01M 4/366 |
| | | | | 252/500 |
| 11,695,110 | B2 * | 7/2023 | Mason | .................. H01M 4/364 |
| | | | | 252/500 |
| 2022/0123282 | A1 * | 4/2022 | Mason | .............. H01M 10/0525 |
| 2022/0149349 | A1 * | 5/2022 | Mason | .................. H01M 4/364 |

* cited by examiner

*Primary Examiner* — Haidung D Nguyen
(74) *Attorney, Agent, or Firm* — MCDONNELL BOEHNEN HULBERT & BERGHOFF LLP

(57) ABSTRACT

This invention relates to particulate electroactive materials comprising a plurality of composite particles, wherein the composite particles comprise: (a) a porous carbon framework including micropores and optional mesopores having a total volume of at least 0.7 $cm^3/g$ and up to 2 $cm^3/g$, wherein at least half of the total micropore and mesopore volume is in the form of pores having a diameter of no more than 1.5 nm; and (b) silicon located within the micropores and optional mesopores of the porous carbon framework in a defined amount relative to the total volume of the micropores and optional mesopores.

27 Claims, No Drawings

ELECTROACTIVE MATERIALS FOR METAL-ION BATTERIES

CROSS-REFERENCE TO RELATED APPLICATIONS

This application is a continuation of U.S. patent application Ser. No. 17/316,908, filed May 11, 2021, which is a continuation of U.S. patent application Ser. No. 16/274,182, filed Feb. 12, 2019, which claims the benefit of priority of United Kingdom Patent Application no. GB1818232.9, filed Nov. 8, 2018, and United Kingdom Patent Application no. GB1820736.5, filed Dec. 19, 2018, each of which is hereby incorporated herein by reference in its entirety.

BACKGROUND OF THE INVENTION

Field

This invention relates in general to electroactive materials that are suitable for use in electrodes for rechargeable metal-ion batteries, and more specifically to particulate materials having high electrochemical capacities that are suitable for use as anode active materials in rechargeable metal-ion batteries.

Technical Background

Rechargeable metal-ion batteries are widely used in portable electronic devices such as mobile telephones and laptops and are finding increasing application in electric or hybrid vehicles. Rechargeable metal-ion batteries generally comprise an anode layer, a cathode layer, an electrolyte to transport metal ions between the anode and cathode layers, and an electrically insulating porous separator disposed between the anode and the cathode. The cathode typically comprises a metal current collector provided with a layer of metal ion containing metal oxide based composite, and the anode typically comprises a metal current collector provided with a layer of an electroactive material, defined herein as a material which is capable of inserting and releasing metal ions during the charging and discharging of a battery. For the avoidance of doubt, the terms "cathode" and "anode" are used herein in the sense that the battery is placed across a load, such that the cathode is the positive electrode and the anode is the negative electrode. When a metal-ion battery is charged, metal ions are transported from the metal-ion-containing cathode layer via the electrolyte to the anode and are inserted into the anode material. The term "battery" is used herein to refer both to a device containing a single anode and a single cathode and to devices containing a plurality of anodes and/or a plurality of cathodes.

There is interest in improving the gravimetric and/or volumetric capacities of rechargeable metal-ion batteries. The use of lithium-ion batteries has already provided a substantial improvement when compared to other battery technologies, but there remains scope for further development. To date, commercial lithium-ion batteries have largely been limited to the use of graphite as an anode active material. When a graphite anode is charged, lithium intercalates between the graphite layers to form a material with the empirical formula $Li_xC_6$ (wherein x is greater than 0 and less than or equal to 1). Consequently, graphite has a maximum theoretical capacity of 372 mAh/g in a lithium-ion battery, with a practical capacity that is somewhat lower (ca. 340 to 360 mAh/g). Other materials, such as silicon, tin and germanium, are capable of intercalating lithium with a significantly higher capacity than graphite but have yet to find widespread commercial use due to difficulties in maintaining sufficient capacity over numerous charge/discharge cycles.

Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$). However, the use of silicon as an anode material is complicated by large volumetric changes on charging and discharging.

Intercalation of lithium into bulk silicon leads to a large increase in the volume of the silicon material, up to 400% of its original volume when silicon is lithiated to its maximum capacity, and repeated charge-discharge cycles cause significant mechanical stress in the silicon material, resulting in fracturing and delamination of the silicon anode material. Volume contraction of silicon particles upon dilithiation can result in a loss of electrical contact between the anode material and the current collector. A further difficulty is that the solid electrolyte interphase (SEI) layer that forms on the silicon surface does not have sufficient mechanical tolerance to accommodate the expansion and contraction of the silicon. As a result, newly exposed silicon surfaces lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. The most widespread approach to address the irreversible capacity loss of silicon-containing anodes is to use some form of finely structured silicon as the electroactive material. It has been reported that fine silicon structures below around 150 nm in cross-section, such as silicon films and silicon nanoparticles are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. For example, nanoscale particles tend to form agglomerates, making it difficult to obtain a useful dispersion of the particles within an anode material matrix. In addition, the formation of agglomerates of nanoscale particles results in an unacceptable capacity loss on repeated charge-discharge cycling.

Ohara et al. (Journal of Power Sources 136 (2004) 303-306) have described the evaporation of silicon onto a nickel foil current collector as a thin film and the use of this structure as the anode of a lithium-ion battery. Although this approach gives good capacity retention, the thin film structures do not give useful amounts of capacity per unit area, and any improvement is eliminated when the film thickness is increased.

WO 2007/083155 discloses that improved capacity retention may be obtained through the use of silicon particles having high aspect ratio, i.e. the ratio of the largest dimension to the smallest dimension of the particle.

It is also known in general terms that electroactive materials such as silicon may be deposited within the pores of a porous carrier material, such as an activated carbon material. These composite materials provide some of the beneficial charge-discharge properties of nanoscale silicon particles while avoiding the handling difficulties of nanoparticles. For instance, Guo et al. (Journal of Materials Chemistry A, 2013, pp. 14075-14079) discloses a silicon-carbon composite material in which a porous carbon substrate provides an electrically conductive framework with silicon nanoparticles deposited within the pore structure of the substrate with uniform distribution. SEI formation over the initial charging cycles is confined to the remaining pore volume such that the remaining silicon is not exposed to the electrolyte in subsequent charging cycles. It is shown that the composite material has improved capacity retention over multiple charging cycles, however the initial capacity of the composite material in mAh/g is significantly lower than for silicon nanoparticles.

JP2003100284 discloses an active material comprising a carbon-based scaffold with small pores branching off from a few larger pores. An electroactive material (e.g. silicon) is indiscriminately located on the walls of both large and small pores and on the external surface of the carbon-based scaffold.

Despite the efforts to date, there is a continued need for improvements in the electrochemical storage capacity of lithium-ion batteries. In particular, there remains a need to identify alternative silicon-based materials which provide the benefit of the high lithiation capacity of silicon but which also have sufficient capacity retention and structural stability for use in a commercially-viable rechargeable battery.

SUMMARY OF THE DISCLOSURE

In one aspect, the disclosure provides a particulate material comprising a plurality of composite particles, wherein the composite particles comprise:
(a) a porous carbon framework comprising micropores and optional mesopores, wherein the micropores and optional mesopores have a total pore volume as measured by gas adsorption of $P_1$ cm$^3$/g, wherein $P_1$ has a value of at least 0.7 and up to 2, wherein the $PD_{50}$ pore diameter as measured by gas adsorption is no more than 1.5 nm; and
(b) a plurality of elemental nanoscale silicon domains located at least within the micropores and of the porous carbon framework;
wherein the weight ratio of silicon to the porous carbon framework in the composite particles is in the range from $[0.5 \times P_1$ to $1.3 \times P_1]:1$.

Additional aspects of the disclosure relate to compositions comprising such particulate materials, electrodes including such particulate materials in electrical contact with a current collector, rechargeable metal-ion batteries comprising such electrodes, and uses of such particulate materials as anode active materials. Other aspects will be apparent based on the detailed description below.

DETAILED DESCRIPTION

The present inventors have determined that the performance of composite materials comprising a porous carbon framework and silicon as an electroactive material located within the porous carbon framework can be improved by using porous carbon frameworks with specific pore structures and a controlled ratio of silicon to the available pore volume.

In a first aspect, the invention provides a particulate material comprising a plurality of composite particles, wherein the composite particles comprise:
(a) a porous carbon framework comprising micropores and optional mesopores, wherein the micropores and optional mesopores have a total pore volume as measured by gas adsorption of $P_1$ cm$^3$/g, wherein $P_1$ has a value of at least 0.7 and up to 2, wherein the $PD_{50}$ pore diameter as measured by gas adsorption is no more than 1.5 nm; and
(b) a plurality of elemental nanoscale silicon domains located at least within the micropores and of the porous carbon framework;
wherein the weight ratio of silicon to the porous carbon framework in the composite particles is in the range from $[0.5 \times P_1$ to $1.3 \times P_1]:1$.

Certain aspects of the invention therefore relate to a particulate material in which the porous carbon framework has relatively high total volume of micropores and mesopores, with pores having a diameter of no more than 1.5 nm constituting at least 50% of the total pore volume. For the avoidance of doubt, $P_1$ as used herein relates to the pore volume of the porous carbon framework when measured in isolation, i.e. in the absence of silicon or any other material occupying the pores of the porous carbon framework.

Elemental silicon is located in the micropores and/or mesopores in the form of a plurality of nanoscale silicon domains. As used herein, the term "nanoscale silicon domain" refers to a nanoscale body of silicon that is located within the pores of the porous carbon framework. At least a portion of the nanoscale silicon domains occupy at least a portion of the micropores having a diameter less than the $PD_{50}$ pore diameter and therefore have a dimension of no more than 1.5 nm. The weight ratio of silicon to the porous carbon framework is related to the total micropore/mesopore volume by the ratio $[0.5 \times P_1$ to $1.3 \times P_1]:1$. By defining the weight ratio of silicon based on the value of $P_1$, the percentage volumetric occupancy of the pore volume by silicon is controlled within specific limits. Put another way, where the weight ratio of silicon to the porous carbon framework is in the range of $[0.5 \times P_1$ to $1.3 \times P_1]:1$, the volume of silicon in the composite particles is equivalent to approximately 20% to 55% of the total micropore/mesopore volume of the porous carbon framework.

Therefore, in certain aspects the invention relates in general terms to a particulate material in which silicon partially occupies the pores of a highly porous carbon framework in which the pore volume is largely in the form of micropores. It has been found that this particle architecture provides an electroactive material with a high gravimetric and volumetric capacity on lithiation and which demonstrates a unique ability to accommodate the expansion of silicon and therefore high reversible capacity retention over multiple charge-discharge cycles.

It has been found that the exceptional reversible capacity retention of the inventive particulate material is a function of the high porosity of the porous carbon framework, the high proportion of micropores in the porous carbon framework and the controlled loading of silicon in the composite relative to the total mesopore/micropore volume.

Without being bound by theory, it is believed that locating nanoscale silicon domains within micropores firstly provides fine silicon structures which are able to lithiate and delithiate without excessive structural stress. It is believed that these very fine silicon domains have a lower resistance to elastic deformation and higher fracture resistance than larger silicon structures. Secondly, by controlling the loading of silicon within the porous carbon framework such that only part of the pore volume is occupied by silicon in the uncharged state, the unoccupied pore volume of the porous carbon framework is able to accommodate a substantial amount of silicon expansion internally. More specifically, it is believed that the highly microporous carbon framework is able to deform elastically with reduced rate of fracture due to thin pore walls and the tensile fracture strength of the framework is very high.

The low resistance of the silicon to elastic deformation therefore works in synergy with the high relative modulus of carbon to drive silicon expansion into the pore volume of the porous carbon framework. Although further lithiation of the silicon results in some external expansion of the entire composite particle, the amount of external expansion is limited due to the silicon expansion that is accommodated internally. To the extent that the particles expand outwardly, the fine pore structure of the porous carbon framework is able to deform without fracturing. By carefully controlling the amount of internal vs external expansion, strain on the porous carbon framework and the silicon domains is limited to a level which is tolerated over large numbers of charge-discharge cycles without substantial loss of capacity. The high total porosity of the porous carbon framework not only provides for high volumetric loadings of silicon, but also ensures that the porous carbon framework is sufficiently resilient to withstand repeated volume changes over multiple charge-discharge cycles.

Yet another factor in the exceptional performance of the inventive particulate material is that SEI formation is minimized. By locating nanoscale silicon domains within micropores as described above, only a small area of silicon surface is accessible to electrolyte and so SEI formation is limited. Additional exposure of silicon in subsequent charge-discharge cycles is substantially prevented such that SEI formation is not a significant failure mechanism that could lead to capacity loss. This stands in clear contrast to the excessive and unconstrained SEI formation that characterizes the material disclosed by Guo, for example (see above).

As a result of the unique particle architecture of the inventive particulate material, the silicon in the composite particles has electrochemical performance that is comparable to that of fine silicon nanoparticles but without the disadvantages of excessive SEI formation and poor dispersibility that make discrete silicon nanoparticles non-viable as an electrode material for commercial use.

The porous carbon framework suitably comprises a three-dimensionally interconnected open pore network comprising the micropores, the optional mesopores, and optionally further comprising a minor volume of macropores. The term "micropore" is used herein to refer to pores of less than 2 nm in diameter, the term "mesopore" is used herein to refer to pores of 2 to 50 nm in diameter, and the term "macropore" is used to refer to pores of greater than 50 nm and up to 100 nm diameter.

References herein to the volume of micropores, mesopores and macropores in the porous carbon framework, and any references to the distribution of pore volume within the porous carbon framework, refer to the internal pore volume of the porous carbon framework taken in isolation (i.e. in the absence of any silicon or other materials occupying some or all of the pore volume).

The porous carbon framework is characterised by a high micropore volume. The total volume of micropores and mesopores (i.e. the total pore volume in the range of 0 to 50 nm) is referred to herein as $P_1$ cm$^3$/g, wherein $P_1$ represents a dimensionless natural number having a value of at least 0.7. The value of $P_1$ is also used to relate the available pore volume in the porous carbon framework and the weight ratio of silicon to the porous carbon framework as set out above.

More preferably, the value of $P_1$ is at least 0.75, more preferably at least 0.8, at least 0.85, more preferably at least 0.9, more preferably at least 0.95, more preferably at least 1, for example at least 1.05, at least 1.1, at least 1.15, or at least 1.2. The use of a high porosity carbon framework is advantageous since it allows a larger amount of silicon to be accommodated within the pore structure, and it has been found that high porosity carbon frameworks in which the pore volume is predominantly in the form of micropores have sufficient strength to accommodate the volumetric expansion of the silicon without fracturing or otherwise degrading the porous carbon framework.

The internal pore volume of the porous carbon framework is capped at a value at which increasing fragility of the porous carbon framework outweighs the advantage of increased pore volume accommodating a larger amount of silicon. In general, the value of $P_1$ may be up to 2. However, more preferably, the value of $P_1$ may be up to 1.8, or up to 1.6, or up to 1.5, or up to 1.4, or up to 1.3.

In accordance with certain embodiments of the invention, the value of $P_1$ may be, for instance, in the range from 0.75 to 2 (i.e. a total volume of micropores and mesopores of 0.75 to 2 cm$^3$/g), or in the range from 0.8 to 2, or in the range from 0.85 to 2, or in the range from 0.9 to 2, or in the range from 0.95 to 2, or in the range from 1 to 2, or in the range from 1.05 to 2, or in the range from 1.1 to 2, or in the range from 0.8 to 1.9, or in the range from 0.85 to 1.9, or in the range from 0.9 to 1.9, or in the range from 0.95 to 1.9, or in the range from 1 to 1.9, or in the range from 1.05 to 1.9, or in the range from 1.1 to 1.9, or in the range from 0.8 to 1.8, or in the range from 0.85 to 1.8, or in the range from 0.9 to 1.8, or in the range from 0.95 to 1.8, or in the range from 1 to 1.8, or in the range from 1.05 to 1.8, or in the range from 1.1 to 1.8, or in the range from 0.8 to 1.7, or in the range from 0.85 to 1.7, or in the range from 0.9 to 1.7, or in the range from 0.95 to 1.7, or in the range from 1 to 1.7, or in the range from 1.05 to 1.7, or in the range from 1.1 to 1.7, or in the range from 0.8 to 1.6, or in the range from 0.85 to 1.6, or in the range from 0.9 to 1.6, or in the range from 0.95 to 1.6, or in the range from 1 to 1.6, or in the range from 1.05 to 1.6, or in the range from 1.1 to 1.6.

The $PD_{50}$ pore diameter of the porous carbon framework is no more than 1.5 nm. The term "$PD_{50}$ pore diameter" as used herein refers to the volume-based median pore diameter, based on the total volume of micropores and mesopores (i.e. the pore diameter below which 50% of the total micropore and mesopore volume, represented by $P_1$, is found). Therefore, in accordance with the invention, at least 50% of the total volume of micropores and mesopores is in the form of micropores having a diameter of no more than 1.5 nm.

As used herein, the general term "$PD_n$ pore diameter" refers to the volume-based nth percentile pore diameter, based on the total volume of micropores and mesopores. For instance, the term "$D_0$ pore diameter" as used herein refers to the pore diameter below which 90% of the total micropore and mesopore volume, represented by $P_1$, is found).

For the avoidance of doubt, any macropore volume (pore diameter greater than 50 nm) is not taken into account for the purpose of determining $PD_n$ values.

In accordance with certain embodiments of the invention, the $PD_{50}$ pore diameter of the porous carbon framework is preferably no more than 1.4 nm, or no more than 1.2 nm, or no more than 1 nm.

More preferably, at least 60% of the total micropore and mesopore volume of the porous carbon framework is in the form of pores having a diameter of no more than 2 nm. Accordingly, the $PD_{60}$ pore diameter of the porous carbon framework is preferably no more than 2 nm, or no more than 1.8 nm, or no more than 1.6 nm, or no more than 1.5 nm, or no more than 1.4 nm, or no more than 1.2 nm, or no more than 1 nm.

More preferably, at least 70% of the total micropore and mesopore volume of the porous carbon framework is in the form of pores having a diameter of no more than 2.5 nm. Accordingly, the $PD_{70}$ pore diameter of the porous carbon framework is preferably no more than 2.5 nm, or no more than 2 nm, or no more than 1.8 nm, or no more than 1.6 nm, or no more than 1.4 nm, or no more than 1.2 nm.

More preferably, at least 80% of the total micropore and mesopore volume of the porous carbon framework is in the form of pores having a diameter of no more than 3 nm. Accordingly, the $PD_{80}$ pore diameter of the porous carbon framework is preferably no more than 3 nm, or no more than 2.5 nm, or no more than 2 nm, or no more than 1.8 nm, or no more than 1.6 nm, or no more than 1.4 nm.

The volume of larger mesopores in the porous carbon framework is preferably limited such that the $PD_{50}$ pore diameter of the porous carbon framework is no more than 10 nm, or no more than 8 nm, or no more than 6 nm, or no more than 5 nm, or no more than 4 nm, or no more than 3 nm, or no more than 2.5 nm, or no more than 2 nm.

Preferably, the $PD_{95}$ pore diameter of the porous carbon framework is no more than 15 nm, or no more than 12 nm, or no more than 10 nm.

In accordance with certain embodiments of the invention, the porous carbon framework may be one in which $PD_{50}$ is no more than 1.5 nm and $PD_{90}$ is no more than 6 nm, or one in which $PD_{50}$ is no more than 1.2 nm and $PD_{90}$ is no more than 5 nm, or one in which $PD_{50}$ is no more than 1 nm and $PD_{90}$ is no more than 4 nm.

A fraction of pores having diameters in the larger mesopore range may be advantageous to facilitate electrolyte access to the silicon. Therefore, pores having a diameter in the range of 10 to 50 nm (i.e. larger mesopores) may optionally constitute up to 1%, up to 2%, up to 5%, or up to 10% of the total micropore and mesopore volume of the porous carbon framework.

The pore size distribution of the porous carbon framework may be monomodal, bimodal or multimodal. As used herein, the term "pore size distribution" relates to the distribution of pore size relative to the cumulative total internal pore volume of the porous carbon framework, not only of micropores and mesopores but also of any macropores present. A bimodal or multimodal pore size distribution may be preferred since close proximity between the pores up to 1.5 nm in diameter and pores of larger diameter provides the advantage of efficient ionic transport through the porous network to the silicon. Accordingly, the particulate material has high ionic diffusivity and therefore improved rate performance.

Optionally, the porous carbon framework has a bimodal or multimodal pore size distribution including at least one peak at less than 2 nm and at least one peak in the range from 5 to 50 nm, preferably with a local minimum in the pore size distribution in the range from 5 to 20 nm. More preferably, the porous carbon framework has a bimodal or multimodal pore size distribution including at least one peak at less than 2 nm and at least one peak in the range from 10 to 40 nm, preferably with a local minimum in the pore size distribution in the range from 5 to 15 nm.

Suitably, a bimodal or multimodal pore size distribution includes a peak pore size in the micropore range and a peak pore size in the mesopore size range which differ from one another by a factor of from 5 to 20, more preferably by a factor of about 10. For instance, the porous carbon framework may have a bimodal pore size distribution including a peak at a pore size of 2 nm and a peak at a pore size of 20 nm.

The total volume of micropores and mesopores and the pore size distribution of micropores and mesopores are determined using nitrogen gas adsorption at 77 K using quenched solid density functional theory (QSDFT) in accordance with standard methodology as set out in ISO 15901-2 and ISO 15901-3. Nitrogen gas adsorption is a technique that characterizes the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm. As set out above, the value of $P_1$ is determined by taking into account only pores of diameter up to and including 50 nm (i.e. only micropores and mesopores), and the values of $PD_n$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous carbon framework comprises macropores, the volume of pores in the range of greater than 50 nm and up to 100 nm is identified herein with the value of $P_2$ cm$^3$/g and is measured by mercury porosimetry. As set out above, the value of $P_2$ relates to the pore volume of the porous carbon framework when measured in isolation, i.e. in the absence of silicon or any other material occupying the pores of the porous carbon framework.

For the avoidance of doubt, the value of $P_2$ takes into account only pores having a diameter of from greater than 50 nm up to and including 100 nm, i.e. it includes only the volume of macropores up to 100 nm in diameter. Any pore volume measured by mercury porosimetry at pore sizes of 50 nm or below is disregarded for the purposes of determining the value of $P_2$ (as set out above, nitrogen adsorption is used to characterize the mesopores and micropores). Pore volume measured by mercury porosimetry above 100 nm is assumed for the purposes of the invention to be inter-particle porosity and is also not taken into account in the measurement of macropores or when determining the value of $P_2$.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension γ taken to be 480 mN/m and the contact angle φ taken to be 140° for mercury at room temperature. The density of mercury is taken to be 13.5462 g/cm³ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

The volume of macropores (and therefore the value of $P_2$) is preferably small as compared to the volume of micropores and mesopores (and therefore the value of $P_1$). While a small fraction of macropores may be useful to facilitate electrolyte access into the pore network, the advantages of the invention are obtained substantially by accommodating silicon in micropores and smaller mesopores.

Thus, in accordance with the invention the total volume of macropores in the porous carbon framework is $P_2$ cm³/g as measured by mercury porosimetry, wherein $P_2$ preferably has a value of no more than $0.2 \times P_1$, or no more than $0.1 \times P_1$, or no more than $0.05 \times P_1$, or no more than $0.02 \times P_1$, or no more than $0.01 \times P_1$, or no more than $0.005 \times P_1$.

$P_2$ preferably has a value of no more than 0.3, or no more than 0.25, or no more than 0.20, or no more than 0.15, or no more than 0.1, or no more than 0.05. As discussed above in relation to larger mesopores, a small pore volume fraction in the macropore range may be advantageous to facilitate electrolyte access to the silicon.

The open pore network optionally includes a hierarchical pore structure, i.e. a pore structure in which there is a degree of ordering of pore sizes, with smaller pores branching from larger pores.

It will be appreciated that intrusion techniques such as gas adsorption and mercury porosimetry are effective only to determine the pore volume of pores that are accessible to nitrogen or to mercury from the exterior of the porous carbon framework. Porosity values ($P_1$ and $P_2$) as specified herein shall be understood as referring to the volume of open pores, i.e. pores that are accessible to a fluid from the exterior of the porous carbon framework. Fully enclosed pores which cannot be identified by nitrogen adsorption or mercury porosimetry shall not be taken into account herein when specifying porosity values. Likewise, any pore volume located in pores that are so small as to be below the limit of detection by nitrogen adsorption is not taken into account for determining the value of $P_1$.

The porous carbon framework may comprise crystalline carbon or amorphous carbon, or a mixture of amorphous and crystalline carbon. The porous carbon framework may be either a hard carbon or soft carbon framework and may suitably be obtained by known procedures involving the pyrolysis of polymers.

As used herein, the term "hard carbon" refers to a disordered carbon matrix in which carbon atoms are found predominantly in the sp² hybridized state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 cm⁻¹) in the Raman spectrum. However, the carbon is not fully graphitic as evidenced by the significant D-band (~1350 cm⁻¹) in the Raman spectrum.

As used herein, the term "soft carbon" also refers to a disordered carbon matrix in which carbon atoms are found predominantly in the sp² hybridized state (trigonal bonds) in polyaromatic domains having dimensions in the range of 5 to 200 nm. In contrast to hard carbons, the polyaromatic domains in soft carbons are associated by intermolecular forces but are not cross-linked with a chemical bond. This means that they will graphitize at high temperature. The porous carbon framework preferably comprises at least 50% sp² hybridized carbon as measured by XPS. For example, the porous carbon framework may suitably comprise from 50% to 98% sp² hybridized carbon, from 55% to 95% sp² hybridized carbon, from 60% to 90% sp² hybridized carbon, or from 70% to 85% sp² hybridized carbon.

A variety of different polymeric materials may be used to prepare suitable porous carbon frameworks. Examples of polymeric materials which form porous carbon frameworks on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different hard carbon materials are available in the art depending on the starting material and the conditions of the pyrolysis process.

The porous carbon framework may undergo a chemical or gaseous activation process to increase the volume of mesopores and micropores. A suitable activation process comprises contacting pyrolysed carbon with one or more of oxygen, steam, CO, $CO_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

The amount of silicon in the composite particles of the invention is preferably selected such that no more than about 55% of the internal pore volume of the porous carbon framework is occupied by silicon (in the uncharged state). Preferably, the silicon occupies from about 25% to about 45% of the internal pore volume of the porous carbon framework, more preferably from about 25% to about 40% of the internal pore volume of the porous carbon framework. Within these preferred ranges, the pore volume of the porous carbon framework is effective to accommodate expansion of the silicon during charging and discharging, but avoids excess pore volume which does not contribute to the volumetric capacity of the particulate material. However, the amount of silicon is also not so high as to impede effective lithiation due to inadequate metal-ion diffusion rates or due to inadequate expansion volume resulting in mechanical resistance to lithiation.

The amount of silicon in the porous carbon framework can be correlated to the available pore volume by the requirement that the weight ratio of silicon to the porous carbon framework is in the range from $[0.5 \times P_1$ to $1.3 \times P_1]:1$. This relationship takes into account the density of silicon and the pore volume of the porous carbon framework to define a weight ratio of silicon at which the pore volume is around 20% to 55% occupied.

Preferably, the weight ratio of silicon to the porous carbon framework is in the range from $[0.55 \times P_1$ to $1.1 \times P_1]:1$, or in the range from $[0.6 \times P_1$ to $1.1 \times P_1]:1$, or in the range from $[0.6 \times P_1$ to $1 \times P_1]:1$, or in the range from $[0.6 \times P_1$ to $0.95 \times P_1]:1$, or in the range from $[0.6 \times P_1$ to $0.9 \times P_1]:1$, or in the range from $[0.65 \times P_1$ to $0.9 \times P_1]:1$, or in the range from $[0.65 \times P_1$ to $0.85 \times P_1]:1$, or in the range from $[0.65 \times P_1$ to $0.8 \times P_1]:1$, or in the range from $[0.7 \times P_1$ to $0.8 \times P_1]:1$.

In some cases, the composite particles may include pores in which fully enclosed void space is capped by the silicon, such that electrolyte access into the void space is prevented.

Preferably at least 90 wt %, more preferably at least 95 wt %, even more preferably at least 98 wt % of the silicon mass in the composite particles is located within the internal pore volume of the porous carbon framework such that there is no or very little silicon located on the external surfaces of the composite particles.

Preferably, the volume of micropores and mesopores in the composite particles (i.e. in the presence of the silicon), as measured by nitrogen gas adsorption, is no more than $0.15 \times P_1$, or no more than $0.10 \times P_1$, or no more than $0.05 \times P_1$, or no more than $0.02 \times P_1$.

The weight ratio of silicon to the porous carbon framework can be determined by elemental analysis. Elemental analysis is used to determine the weight percentages of both silicon and carbon in the composite particles. Optionally, the amounts of hydrogen, nitrogen and oxygen may also be determined by elemental analysis. Preferably, elemental analysis is also used to determine the weight percentage of carbon (and optionally hydrogen, nitrogen and oxygen) in the porous carbon framework alone. Determining the weight percentage of carbon in the in the porous carbon framework alone takes account of the possibility that the porous carbon framework contains a minor amount of heteroatoms within its molecular framework. Both measurements taken together allow the weight percentage of silicon relative to the entire porous carbon framework to be determined reliably.

The silicon content is determined by ICP-OES (Inductively coupled plasma-optical emission spectrometry). A number of ICP-OES instruments are commercially available, such as the iCAP® 7000 series of ICP-OES analyzers available from ThermoFisher Scientific. The carbon content of the composite particles and of the porous carbon framework alone (as well as the hydrogen, nitrogen and oxygen content if required) are determined by IR absorption-based elemental analysis. Suitable instruments for determining carbon, hydrogen, nitrogen and oxygen content include the TruSpec® Micro elemental analyser, the LECO model CS844 (carbon) and the LECO model ONH836 (hydrogen, nitrogen and oxygen), all available from Leco Corporation.

The composite particles preferably have a low total oxygen content. Oxygen may be present in the composite particles for instance as part of the porous carbon framework or as an oxide layer on any exposed silicon surfaces. Preferably, the total oxygen content of the composite particles is less than 15 wt %, more preferably less than 10 wt %, more preferably less than 5 wt %, for example less than 2 wt %, or less than 1 wt %, or less than 0.5 wt %.

The silicon may optionally comprise a minor amount of one or more dopants. Suitable dopants include boron and phosphorus, other n-type or p-type dopants, nitrogen, or germanium. Preferably, the dopants are present in a total amount of no more than 2 wt % based on the total amount of silicon and the dopant(s).

In certain aspects, the composite particles described herein are formed chiefly of the elements carbon, hydrogen and oxygen (e.g., individually in the amounts as described above). In certain embodiments, the sum of the amount of silicon and carbon (measured as described above) of the composite particles is at least 80%, e.g., at least 85 wt %, at least 90 wt %, or at least 95 wt %. For example, in various embodiments, the sum of the amount of silicon and carbon is in the range of 80-98 wt %, or 85-98 wt %, or 90-98 wt %, or 95-98 wt %. In certain embodiments, the sum of the amount of silicon, carbon and oxygen (measured as described above) is at least 90 wt %, e.g., at least 95 wt %, at least 97 wt %, or at least 98 wt %. For example in various embodiments, the sum of the amount of silicon, carbon and oxygen is in the range of 90-105 wt %, or 90-100 wt %, or 90-99 wt %, or 95-105 wt %, or 95-100 wt %, or 97-105 wt %, or 97-100 wt %, or 98-105 wt %, or 98-100 wt %. The person of ordinary skill in the art will appreciate that the different measurement techniques used may result in a sum of the as-measured silicon, carbon, and oxygen amounts that are slightly above 100%. And as the person of ordinary skill in the art will appreciate, many of the elemental analysis techniques described herein are destructive, such that different test samples from a single composition must be tested to provide, e.g., a measurement of silicon weight percent and a measurement of carbon weight percent.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

The terminology "$D_n$" used herein to define particle diameter distributions should be distinguished from the terminology "$PD_n$" which is used herein, as described above, to define pore diameter distributions.

Particle diameters and particle size distributions are determined by routine laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photo-detector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The composite particles may have a $D_0$ particle diameter in the range from 0.5 to 50 μm. Optionally, the $D_{50}$ particle diameter may be at least 1 μm, or at least 2 μm, or at least 3 μm, or at least 4 μm, or at least 5 μm. Optionally the $D_{50}$ particle diameter may be no more than 40 μm, or no more than 30 μm, or no more than 25 μm, or no more than 20 μm, or no more than 15 μm.

For instance, the composite particles may have a $D_{50}$ particle diameter in the range from 1 to 25 μm, or from 1 to 20 μm, or from 2 to 20 μm, or from 2 to 15 μm, or from 3 to 15 μm. Particles within these size ranges and having porosity and a pore diameter distribution as set out herein are ideally suited for use in anodes for metal-ion batteries, due to their dispersibility in slurries, their structural robustness, their capacity retention over repeated charge-discharge cycles, and their suitability for forming dense electrode layers of uniform thickness in the conventional range from 20 to 50 μm.

The $D_{10}$ particle diameter of the composite particles is preferably at least 0.2 μm, or at least 0.5 μm, or at least 0.8 μm, or at least 1 μm, or at least 1.5 μm, or at least 2 μm. By maintaining the $D_{10}$ particle diameter at 0.2 μm or more, the potential for undesirable agglomeration of sub-micron sized particles is reduced, resulting in improved dispersibility of the particulate material and improved capacity retention.

The $D_{90}$ particle diameter of the composite particles is preferably no more than 80 μm, or no more than 60 μm, or no more than 40 μm, or no more than 30 μm, or no more than 25 μm, or no more than 20 μm. The presence of very large particles results in non-uniform forming packing of the particles in electrode active layers, thus disrupting the formation of dense electrode layers, particularly electrode layers having a thickness in the range from 20 to 50 μm. Therefore, it is preferred that the $D_{90}$ particle diameter is no more than 40 μm, and more preferably lower still.

The composite particles preferably have a narrow size distribution span. For instance, the particle size distribution span (defined as $(D_{90}-D_{10})/D_{90}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

The composite particles may be spheroidal in shape. Spheroidal particles as defined herein may include both spherical and ellipsoidal particles and the shape of the composite particles of the invention may suitably be defined by reference to the sphericity and the aspect ratio of the particles of the invention. Spheroidal particles are found to be particularly well-suited to dispersion in slurries without the formation of agglomerates. In addition, the use of porous spheroidal particles is surprisingly found to provide a further improvement in strength when compared to porous particles and porous particle fragments of irregular morphology.

The sphericity of an object is conventionally defined as the ratio of the surface area of a sphere to the surface area of the object, wherein the object and the sphere have identical volume. However, in practice it is difficult to measure the surface area and volume of individual particles at the micron scale. However, it is possible to obtain highly accurate two-dimensional projections of micron scale particles by scanning electron microscopy (SEM) and by dynamic image analysis, in which a digital camera is used to record the shadow projected by a particle. The term "sphericity" as used herein shall be understood as the ratio of the area of the particle projection to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population.

As used herein, the term "spheroidal" as applied to the composite particles of the invention shall be understood to refer to a material having an average sphericity of at least 0.70. Preferably, the porous spheroidal particles of the invention have an average sphericity of at least 0.85, more preferably at least 0.90, more preferably at least 0.92, more preferably at least 0.93, more preferably at least 0.94, more preferably at least 0.95. Optionally, the porous spheroidal particles may have an average sphericity of at least 0.96, or at least 0.97, or at least 0.98, or at least 0.99.

It will be understood that the circumference and area of a two-dimensional particle projection will depend on the orientation of the particle in the case of any particle which is not perfectly spheroidal. However, the effect of particle orientation may be offset by reporting sphericity and aspect ratios as average values obtained from a plurality of particles having random orientation. A number of SEM and dynamic image analysis instruments are commercially available, allowing the sphericity and aspect ratio of a particulate material to be determined rapidly and reliably. Unless stated otherwise, sphericity values as specified or reported herein are as measured by a CamSizer XT particle analyzer from Retsch Technology GmbH. The CamSizer XT is a dynamic image analysis instrument which is capable of obtaining highly accurate distributions of the size and shape for particulate materials in sample volumes of from 100 mg to 100 g, allowing properties such as average sphericity and aspect ratios to be calculated directly by the instrument.

The composite particles of the invention preferably have a BET surface area of no more than 150 $m^2/g$, or no more than 100 $m^2/g$, or no more than 80 $m^2/g$, or no more than 60 $m^2/g$, or no more than 40 $m^2/g$, or no more than 30 $m^2/g$, or no more than 25 $m^2/g$, or no more than 20 $m^2/g$, or no more than 15 $m^2/g$, or no more than 10 $m^2/g$. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. In general, a low BET surface area is preferred in order to minimize the formation of solid electrolyte interphase (SEI) layers at the surface of the composite particles during the first charge-discharge cycle of an anode comprising the particulate material of the invention. However, a BET surface area which is excessively low results in unacceptably low charging rate and capacity due to the inaccessibility of the bulk of the electroactive material to metal ions in the surrounding electrolyte. For instance, the BET surface area is preferably at least 0.1 $m^2/g$, or at least 1 $m^2/g$, or at least 2 $m^2/g$, or at least 5 $m^2/g$. For instance, the BET surface area may be in the range from 1 to 25 $m^2/g$, more preferably in the range from 2 to 15 $m^2/g$.

The particulate material of the invention typically has a specific charge capacity on first lithiation of 1200 to 2340 mAh/g. Preferably the particulate material of the invention has a specific charge capacity on first lithiation of at least 1400 mAh/g.

The composite particles of the invention are suitably prepared via the chemical vapor infiltration (CVI) of a silicon-containing precursor into the pore structure of the porous carbon framework. As used herein, CVI refers to processes in which a gaseous silicon-containing precursor is thermally decomposed on a surface to form elemental silicon at the surface and gaseous by-products.

Suitable gaseous silicon-containing precursors include silane ($SiH_4$), silane derivatives (e.g. disilane, trisilane and tetrasilane), and trichlorosilane ($SiHCl_3$). The silicon-containing precursors may be used either in pure form or more usually as a diluted mixture with an inert carrier gas, such as nitrogen or argon. For instance, the silicon-containing precursor may be used in an amount in the range from 0.5-20 vol %, or 1-10 vol %, or 1-5 vol % based on the total volume of the silicon-containing precursor and the inert carrier gas. The CVI process is suitably carried out at a low partial pressure of silicon precursor with total pressure of 101.3 kPa (i.e. 1 atm), the remaining partial pressure made up to atmospheric pressure using an inert padding gas such as hydrogen, nitrogen or argon. Deposition temperatures ranging from 400 to 700° C. are used, for example from 450 to 550° C., or 450 to 500° C. The CVI process may suitably be performed in a fixed bed reactor, fluidized bed reactor, or rotary kiln.

As an example of a fixed-bed reactor method, 1.8 g of a particulate porous framework was placed on a stainless-steel plate at a constant thickness of 1 mm along its length. The plate was then placed inside a stainless-steel tube of outer diameter 60 mm with gas inlet and outlet lines located in the hot zone of a retort furnace. The furnace tube was purged with nitrogen gas for 30 minutes at room temperature, then the sample temperature was increased to 450 to 500° C. The nitrogen gas flow-rate is adjusted to ensure a gas residence time of at least 90 seconds in the furnace tube and maintained at that rate for 30 minutes. Then, the gas supply is switched from nitrogen to a mixture of monosilane in nitrogen at 1.25 vol. % concentration. Dosing of monosilane is performed over a 5-hour period with a reactor pressure maintained at 101.3 kPa (1 atm). After dosing has finished the gas flow rate is kept constant whilst the silane is purged from the furnace using nitrogen. The furnace is purged for 30 minutes under nitrogen before being cooled down to room temperature over several hours. The atmosphere is then switched over to air gradually over a period of two hours by switching the gas flow from nitrogen to air from a compressed air supply.

The particulate material of the invention may optionally include a conductive carbon coating. Suitably a conductive carbon coating may be obtained by a chemical vapor deposition (CVD) method. CVD is a well-known methodology in the art and comprises the thermal decomposition of a volatile carbon-containing gas (e.g. ethylene) onto the surface of the particulate material. Alternatively, the carbon coating may be formed by depositing a solution of a carbon-containing compound onto the surface of the particulate material followed by pyrolysis. The conductive carbon coating is sufficiently permeable to allow lithium access to the interior of the composite particles without excessive resistance, so as not to reduce the rate performance of the composite particles. For instance, the thickness of the carbon coating may suitably be in the range from 2 to 30 nm. Optionally, the carbon coating may be porous and/or may only cover partially the surface of the composite particles.

A carbon coating has the advantages that it further reduces the BET surface area of the particulate material by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an improved surface for the formation of a stable SEI layer, resulting in improved capacity retention on cycling.

In a second aspect of the invention, there is provided a composition comprising a particulate material according to the first aspect of the invention and at least one other component. In particular, the particulate material of the first aspect of the invention may be used as a component of an electrode composition.

Thus, there is provided a composition comprising a particulate material according to the first aspect of the invention and at least one other component selected from: (i) a binder; (ii) a conductive additive; and (iii) an additional particulate electroactive material.

The particulate material used to prepare the electrode composition of the second aspect of the invention may have any of the features described as preferred or optional with regard to the first aspect of the invention.

The electrode composition may be a hybrid electrode composition which comprises a particulate material according to the first aspect of the invention and at least one additional particulate electroactive material. Examples of additional particulate electroactive materials include graphite, hard carbon, silicon, tin, germanium, gallium, aluminium and lead. The at least one additional particulate electroactive material is preferably selected from graphite and hard carbon, and most preferably the at least one additional particulate electroactive material is graphite.

The at least one additional particulate electroactive material preferably has a Do particle diameter in the range from 10 to 50 µm, preferably from 10 to 40 µm, more preferably from 10 to 30 µm and most preferably from 10 to 25 µm, for example from 15 to 25 µm.

The $D_{10}$ particle diameter of the at least one additional particulate electroactive material is preferably at least 5 µm, more preferably at least 6 µm, more preferably at least 7 µm, more preferably at least 8 µm, more preferably at least 9 µm, and still more preferably at least 10 µm.

The $D_{50}$ particle diameter of the at least one additional particulate electroactive material is preferably no more than 100 µm, more preferably no more than 80 µm, more preferably no more than 60 µm, more preferably no more than 50 µm, and most preferably no more than 40 µm.

The at least one additional particulate electroactive material is preferably selected from carbon-comprising particles, graphite particles and/or hard carbon particles, wherein the graphite and hard carbon particles have a $D_{50}$ particle diameter in the range from 10 to 50 µm. Still more preferably, the at least one additional particulate electroactive material is selected from graphite particles, wherein the graphite particles have a $D_{50}$ particle diameter in the range from 10 to 50 μm.

The particulate material of the invention preferably constitutes from 1 to 95 wt % of the total dry weight of the electroactive materials in the electrode composition (i.e. the total dry weight of the particulate material of the invention and the at least one additional particulate electroactive material). More preferably, the particulate material of the invention constitutes from 2 to 90 wt %, more preferably from 5 to 85 wt %, more preferably from 10 to 80 wt % of the total dry weight of the electroactive materials in the electrode composition.

The electrode composition may optionally comprise a binder. A binder functions to adhere the electrode composition to a current collector and to maintain the integrity of the electrode composition. Examples of binders which may be used in accordance with the present invention include polyvinylidene fluoride (PVDF), polyacrylic acid (PAA) and alkali metal salts thereof, modified polyacrylic acid (mPAA) and alkali metal salts thereof, carboxymethylcellulose (CMC), modified carboxymethylcellulose (mCMC), sodium carboxymethylcellulose (Na-CMC), polyvinylalcohol (PVA), alginates and alkali metal salts thereof, styrene-butadiene rubber (SBR) and polyimide. The electrode composition may comprise a mixture of binders. Preferably, the binder comprises polymers selected from polyacrylic acid (PAA) and alkali metal salts thereof, and modified polyacrylic acid (mPAA) and alkali metal salts thereof, SBR and CMC.

The binder may suitably be present in an amount of from 0.5 to 20 wt %, preferably 1 to 15 wt % and most preferably 2 to 10 wt %, based on the total dry weight of the electrode composition.

The binder may optionally be present in combination with one or more additives that modify the properties of the binder, such as cross-linking accelerators, coupling agents and/or adhesive accelerators.

The electrode composition may optionally comprise one or more conductive additives. Preferred conductive additives are non-electroactive materials which are included so as to improve electrical conductivity between the electroactive components of the electrode composition and between the electroactive components of the electrode composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt % and most preferably 2 to 10 wt %, based on the total dry weight of the electrode composition.

In a third aspect, the invention provides an electrode comprising a particulate material as defined with reference to the first aspect of the invention in electrical contact with a current collector. The particulate material used to prepare the electrode of the third aspect of the invention may have any of the features described as preferred or optional with regard to the first aspect of the invention.

As used herein, the term current collector refers to any conductive substrate which is capable of carrying a current to and from the electroactive particles in the electrode composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range from 10 μm to 1 mm, for example from 20 to 500 μm, or from 50 to 200 μm.

Preferably, the electrode comprises an electrode composition as defined with reference to the second aspect of the invention in electrical contact with a current collector. The electrode composition may have any of the features described as preferred or optional with regard to the second aspect of the invention.

The electrode of the third aspect of the invention may suitably be fabricated by combining the particulate material of the invention (optionally in the form of the electrode composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 μm to 2 mm, preferably 20 μm to 1 mm, preferably 20 μm to 500 μm, preferably 20 μm to 200 μm, preferably 20 μm to 100 μm, preferably 20 μm to 50 μm.

Alternatively, the slurry may be formed into a freestanding film or mat comprising the particulate material of the invention, for instance by casting the slurry onto a suitable casting template, removing the solvent and then removing the casting template. The resulting film or mat is in the form of a cohesive, freestanding mass which may then be bonded to a current collector by known methods.

The electrode of the third aspect of the invention may be used as the anode of a metal-ion battery. Thus, in a fourth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably the rechargeable metal-ion battery of the invention is a lithium-ion battery, and the cathode active material is capable of releasing and lithium ions.

The cathode active material is preferably a metal oxide-based composite. Examples of suitable cathode active materials include $LiCoO_2$, $LiCo_{0.99}Al_{0.01}O_2$, $LiNiO_2$, $LiMnO_2$, $LiCo_{0.5}Ni_{0.5}O_2$, $LiCo_{0.7}Ni_{0.3}O_2$, $LiCo_{0.8}Ni_{0.2}O_2$, $LiCo_{0.82}Ni_{0.18}O_2$, $LiCo_{0.8}Ni_{0.15}Al_{0.05}O_2$, $LiNi_{0.4}Co_{0.3}Mn_{0.3}O_2$ and $LiNi_{0.33}Co_{0.33}Mn_{0.34}O_2$. The cathode current collector is generally of a thickness of between 3 to 500 μm. Examples of materials that can be used as the cathode current collector include aluminium, stainless steel, nickel, titanium and sintered carbon.

The electrolyte is suitably a non-aqueous electrolyte containing a metal salt, e.g. a lithium salt, and may include, without limitation, non-aqueous electrolytic solutions, solid electrolytes and inorganic solid electrolytes. Examples of non-aqueous electrolyte solutions that can be used include non-protic organic solvents such as propylene carbonate, ethylene carbonate, butylene carbonates, dimethyl carbonate, diethyl carbonate, gamma butyrolactone, 1,2-dimethoxyethane, 2-methyltetrahydrofuran, dimethylsulfoxide, 1,3-dioxolane, formamide, dimethylformamide, acetonitrile, nitromethane, methylformate, methyl acetate, phosphoric acid triesters, trimethoxymethane, sulfolane, methyl sulfolane and 1,3-dimethyl-2-imidazolidinone.

Examples of organic solid electrolytes include polyethylene derivatives polyethyleneoxide derivatives, polypropylene oxide derivatives, phosphoric acid ester polymers, polyester sulfide, polyvinylalcohols, polyvinylidine fluoride and polymers containing ionic dissociation groups.

Examples of inorganic solid electrolytes include nitrides, halides and sulfides of lithium salts such as $Li_5Nl_2$, $Li_3N$, LiI, $LiSiO_4$, $Li_2SiS_3$, $Li_4SiO_4$, LiOH and $Li_3PO_4$.

The lithium salt is suitably soluble in the chosen solvent or mixture of solvents. Examples of suitable lithium salts include LiCl, LiBr, LiI, $LiClO_4$, $LiBF_4$, $LiBC_4O_8$, $LiPF_6$, $LiCF_3SO_3$, $LiAsF_6$, $LiSbF_6$, $LiAlCl_4$, $CH_3SO_3Li$ and $CF_3SO_3Li$.

Where the electrolyte is a non-aqueous organic solution, the metal-ion battery is preferably provided with a separator interposed between the anode and the cathode. The separator is typically formed of an insulating material having high ion permeability and high mechanical strength. The separator typically has a pore diameter of between 0.01 and 100 μm and a thickness of between 5 and 300 μm. Examples of suitable electrode separators include a micro-porous polyethylene film.

The separator may be replaced by a polymer electrolyte material and in such cases the polymer electrolyte material is present within both the composite anode layer and the composite cathode layer. The polymer electrolyte material can be a solid polymer electrolyte or a gel-type polymer electrolyte.

In a fifth aspect, the invention provides the use of a particulate material as defined with reference to the first aspect of the invention as an anode active material. Preferably, the particulate material is in the form of an electrode composition as defined with reference to the second aspect of the invention, and most preferably the electrode composition comprises one or more additional particulate electroactive materials as defined above.

The invention claimed is:

1. A particulate material comprising a plurality of composite particles, wherein the composite particles comprise:
   (a) a porous carbon framework comprising micropores and optional mesopores,
      wherein the micropores and optional mesopores have a total pore volume as measured by gas adsorption of $P_1$ cm³/g, wherein $P_1$ has a value of at least 0.7 and up to 1.3,
      wherein the $PD_{50}$ pore diameter as measured by gas adsorption is no more than 1.5 nm, and
      wherein the $PD_{90}$ pore diameter of the porous carbon framework is no more than 10 nm; and
   (b) a plurality of elemental nanoscale silicon domains located at least within the micropores of the porous carbon framework;
   wherein the weight ratio of silicon to the porous carbon framework in the composite particles is in the range from $[0.7 \times P_1$ to $1.3 \times P_1]:1$, and
   wherein at least 90 wt % of the silicon mass in the composite particles is located within the internal pore volume of the porous carbon framework.

2. The particulate material according to claim 1, wherein $P_1$ has a value of at least 0.75.

3. The particulate material according to claim 1, wherein the $PD_{50}$ pore diameter of the porous carbon framework is no more than 1.4 nm.

4. The particulate material according to claim 1, wherein the $PD_{60}$ pore diameter of the porous carbon framework is no more than 2 nm.

5. The particulate material according to claim 4, wherein the $PD_{70}$ pore diameter of the porous carbon framework is no more than 2.5 nm.

6. The particulate material according to claim 5, wherein the $PD_{80}$ pore diameter of the porous carbon framework is no more than 3 nm.

7. The particulate material according to claim 1, wherein the $PD_{90}$ pore diameter of the porous carbon framework is no more than 8 nm.

8. The particulate material according to claim 7, wherein the $PD_{95}$ pore diameter of the porous carbon framework is no more than 15 nm.

9. The particulate material according to claim 1, wherein the porous carbon framework has a monomodal pore size distribution.

10. The particulate material according to claim 1, wherein the porous carbon framework has a bimodal or multimodal pore size distribution.

11. The particulate material according to claim 10, wherein the porous carbon framework has a bimodal or multimodal pore size distribution including at least one peak at less than 2 nm and at least one peak in the range from 5 to 50 nm.

12. The particulate material according to claim 1, wherein the porous carbon framework further comprises macropores having a diameter in the range from greater than 50 nm to 100 nm having a total volume $P_2$ cm³/g as measured by mercury porosimetry, wherein $P_2$ is no more than $0.2 \times P_1$.

13. The particulate material according to claim 1, wherein the weight ratio of silicon to the porous carbon framework is in the range from $[0.7 \times P_1$ to $1.1 \times P_1]:1$.

14. The particulate material according to claim 1, wherein at least a portion of the micropores comprise void space that is fully enclosed by the silicon.

15. The particulate material according to claim 1, wherein the composite particles have a $D_{50}$ particle diameter in the range of 0.5 to 50 μm.

16. The particulate material according to claim 15, wherein the composite particles have a $D_{50}$ particle diameter of at least 1 μm.

17. The particulate material according to claim 15, wherein the composite particles have a $D_{50}$ particle diameter of no more than 40 μm.

18. The particulate material according to claim 1, wherein the composite particles have a $D_{10}$ particle diameter of at least 0.2 μm.

19. The particulate material according to claim 1, wherein the composite particles have a $D_{90}$ particle diameter of no more than 80 μm.

20. The particulate material according to claim 1, wherein the composite particles have a BET surface area of at least 0.1 m²/g and no more than 60 m²/g.

21. The particulate material according to claim 1, wherein the volume of micropores and mesopores of the composite particles, as measured by nitrogen gas adsorption, is no more than $0.15 \times P_1$.

22. The particulate material according to claim 1, having specific capacity on lithiation of 1200 to 2340 mAh/g.

23. The particulate material according to claim 1, wherein
   the $PD_{50}$ pore diameter of the porous carbon framework is no more than 1.5 nm; and
   the $PD_{90}$ pore diameter of the porous carbon framework is no more than 6 nm.

24. A composition comprising a particulate material as defined in claim 1 and at least one other component selected from: (i) a binder; (ii) a conductive additive; and (iii) an additional particulate electroactive material.

25. An electrode comprising a particulate material as defined in claim 1 in electrical contact with a current collector.

26. A rechargeable metal-ion battery comprising:
 (i) an anode, wherein the anode comprises an electrode as described in claim 25;
 (ii) a cathode comprising a cathode active material capable of releasing and reabsorbing metal ions; and
 (iii) an electrolyte between the anode and the cathode.

27. A particulate material comprising a plurality of composite particles, wherein the composite particles comprise:
 (a) a porous carbon framework comprising micropores and optional mesopores,
    wherein the micropores and optional mesopores have a total pore volume as measured by gas adsorption of $P_1$ cm$^3$/g, wherein $P_1$ has a value of at least 0.7 and up to 1.3,
    wherein the $PD_{50}$ pore diameter as measured by gas adsorption is no more than 1.5 nm; and
 (b) a plurality of elemental nanoscale silicon domains located at least within the micropores of the porous carbon framework;
 wherein the weight ratio of silicon to the porous carbon framework in the composite particles is in the range from $[0.7 \times P_1$ to $1.3 \times P_1]$:1,
 wherein at least 90 wt % of the silicon mass in the composite particles is located within the internal pore volume of the porous carbon framework; and
 wherein the composite particles have a $D_{50}$ particle diameter of at least 2 μm.

\* \* \* \* \*